United States Patent
Malmberg

[19]

[11] Patent Number: 6,116,410
[45] Date of Patent: Sep. 12, 2000

[54] DEVICE FOR STEERING A CONVEYOR BELT

[75] Inventor: Mats Anders Malmberg, Trelleborg, Sweden

[73] Assignee: Svedala Trellex AB, Trelleborg, Sweden

[21] Appl. No.: 09/043,865

[22] Filed: Mar. 26, 1998

Related U.S. Application Data

[63] Continuation of application No. PCT/SE97/01031, Jun. 12, 1997.

[30] Foreign Application Priority Data

Nov. 1, 1996 [SE] Sweden ................................ 9604019

[51] Int. Cl.⁷ .................................................. B65G 39/16
[52] U.S. Cl. ............................................................. 198/806
[58] Field of Search ................................. 198/806, 810.3

[56] References Cited

U.S. PATENT DOCUMENTS

| | | | |
|---|---|---|---|
| 2,160,057 | 5/1939 | Carus et al. | 198/806 |
| 2,725,757 | 12/1955 | Murphy | 198/806 |
| 3,058,574 | 10/1962 | Gianukos | 198/806 |
| 3,303,924 | 2/1967 | Hartzell, Jr. | 198/806 |
| 3,593,841 | 7/1971 | Leo | 198/806 |
| 3,621,728 | 11/1971 | Steorts, Jr. | 198/806 |
| 4,506,782 | 3/1985 | Jeanneret et al. | 198/806 |
| 4,936,441 | 6/1990 | Akenaka | 198/806 |
| 5,609,241 | 3/1997 | Shaw | 198/806 |
| 5,950,806 | 9/1999 | Warneke | 198/806 |

FOREIGN PATENT DOCUMENTS

| | | |
|---|---|---|
| 199731948 B2 | 11/1999 | Australia. |
| 2110382 | 6/1972 | France. |
| 2117781 | 7/1972 | France. |
| 284 459 A5 | 11/1990 | Germany. |
| 111307 | 8/1980 | Japan ..................................... 198/806 |
| 344367 | 3/1960 | Switzerland. |
| 491800 | 7/1970 | Switzerland. |
| 1555239 | 4/1990 | U.S.S.R. ................................ 198/806 |
| 1738738 | 6/1992 | U.S.S.R. . |
| 1812159 | 4/1993 | U.S.S.R. . |
| 962164 | 7/1964 | United Kingdom ..................... 198/806 |
| WO 95/14627 | 6/1995 | WIPO . |

*Primary Examiner*—Christopher P. Ellis
*Assistant Examiner*—Khoi H. Tran
*Attorney, Agent, or Firm*—Luedeka, Neely & Graham, P.C.

[57] ABSTRACT

Belt-position sensing structure (30) and belt readjustment apparatus (36) are used to steer a conveyor belt (11)) and to center said belt relative to the intended path of travel of the belt. The belt readjustment apparatus (36) is a belt-support roller (36) intended to engage the belt and to roll against the latter and being pivotal in the principal plane of the belt. The belt-position sensing structure (30) is connected to the belt-support roller (36) via a linkage system (27, 34) for pivoting and setting the belt-support roller in a pivotal position in which said belt-support roller, by engaging the belt, exerts a readjustment force on the belt.

21 Claims, 4 Drawing Sheets

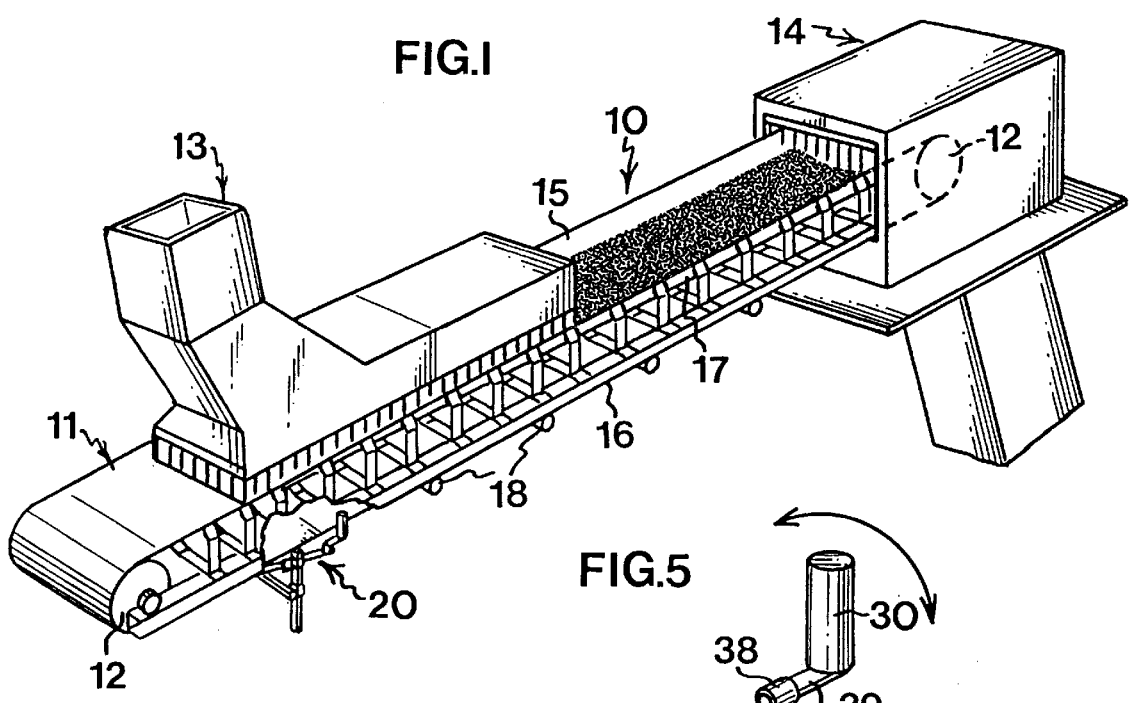
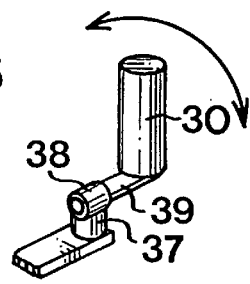
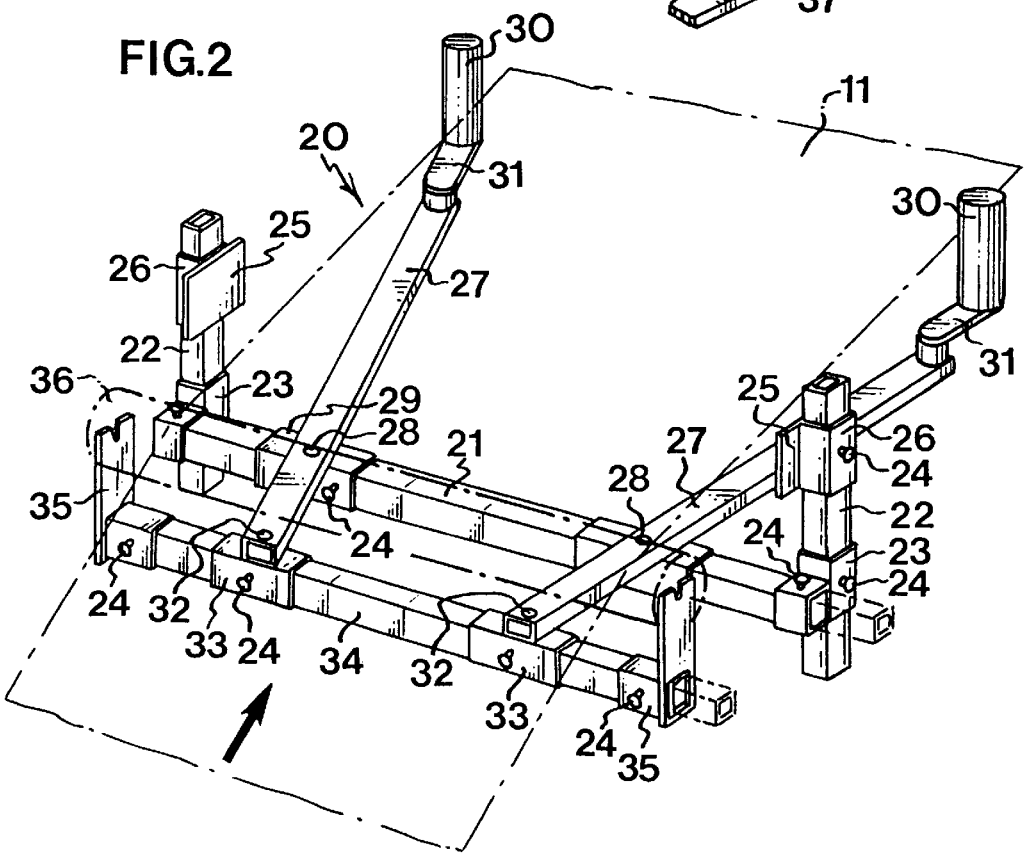

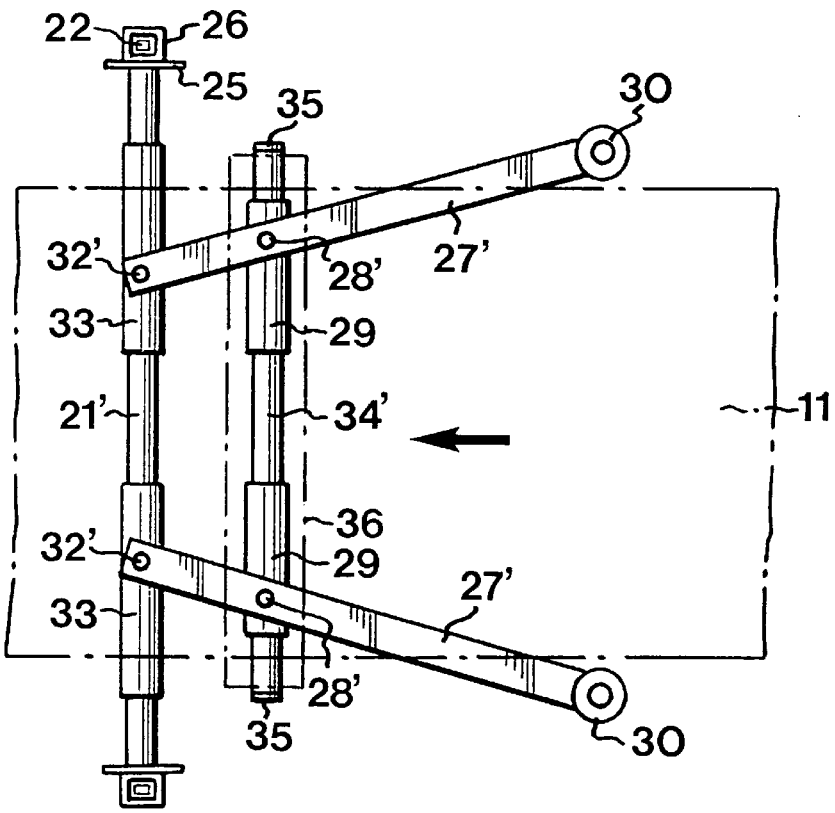
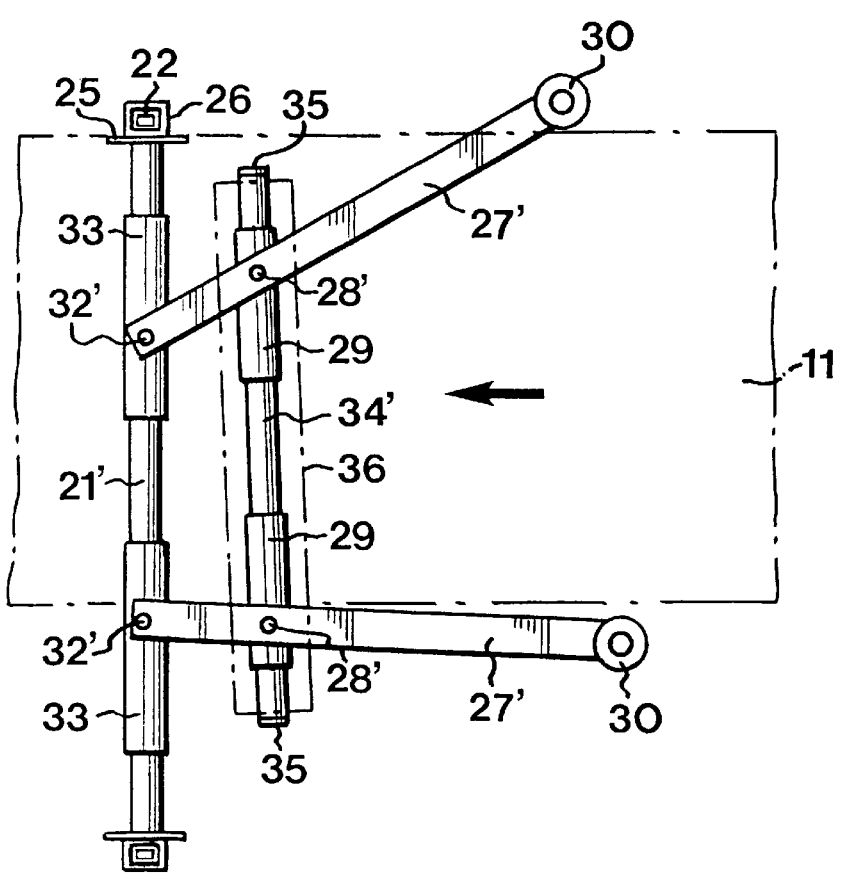

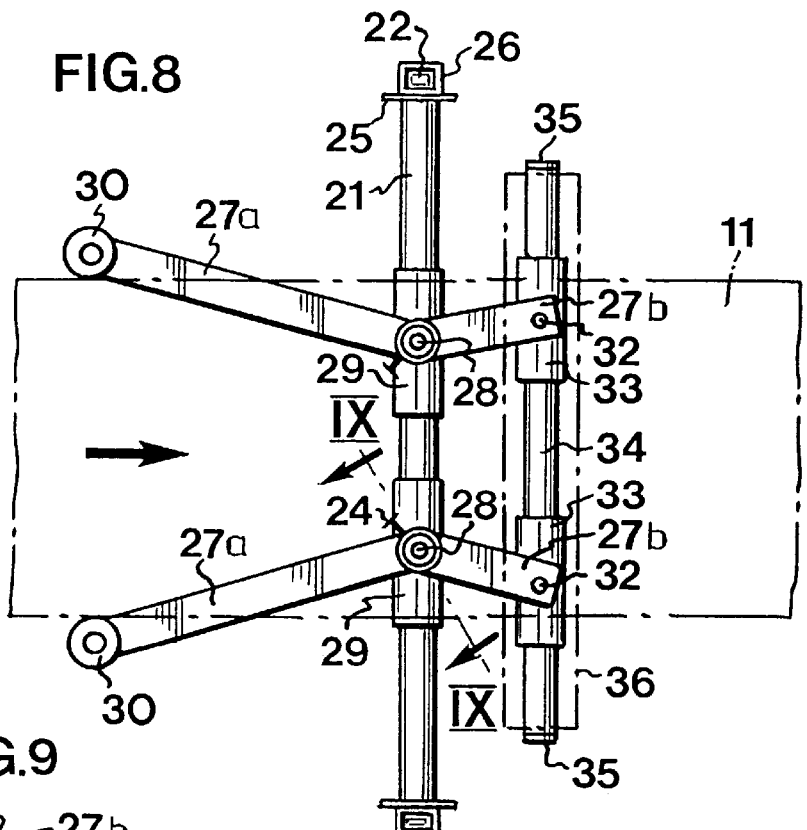
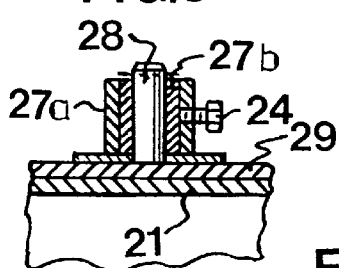
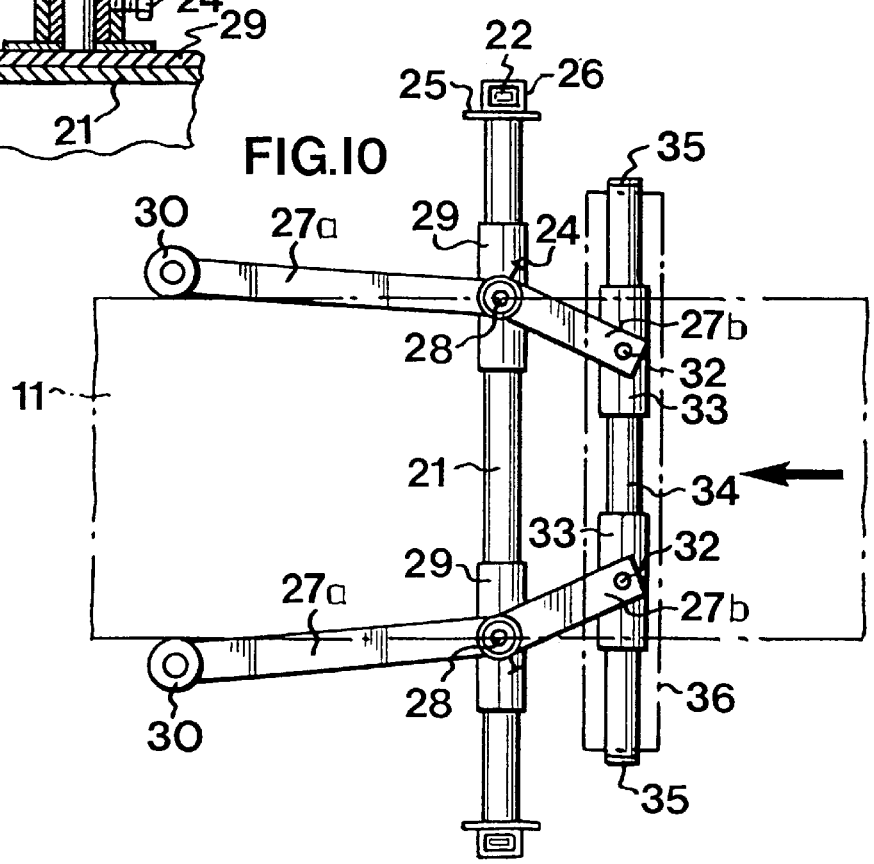

DEVICE FOR STEERING A CONVEYOR BELT

This application is a continuation of international application number PCT SE97/01031, filed Jun. 12, 1997, pending.

The present invention relates to a device for steering a conveyor belt in a belt conveyor.

A problem frequently encountered in the operation of belt conveyors is the tendency of the travelling belt to run out of line or creep laterally relative to its intended path of movement through the conveyor. Lateral displacement, i.e. displacement of the conveyor belt transversely of its direction of travel may result e.g. in damages on the belt, owing to the belt edges coming into contact with stationary parts of the belt conveyor frame.

In order to solve this problem many conveyors have been equipped with one or several support rollers which support the conveyor belt during its return travel and which are manually angularly adjustable relative to the intended direction of travel of the belt. The angular orientation of these support rollers is adjusted during the running-in of the belt conveyor to ensure that during normal operational conditions the belt will travel through the conveyor in a correctly centred condition. Should a tendency to lateral belt displacement arise during the operation, due for instance to elongation of the conveyor belt or to dirt and deposits having accumulated on the end rollers, manual post-adjustment of the set angular position of these support rollers is necessary. Supplementary work is required therefor and furthermore, in many cases the conveyor must be stopped during the adjustment work. By setting a support roller at an angle it thus is possible to compensate for the tendency of the belt to run out of line by moving laterally relative to its intended direction of travel.

Devices have also.,been suggested serving to automatically adjust the conveyor for adaptation thereof to such lateral movements of the conveyor belt. An automatic self-adjusting or self-aligning device of this kind is illustrated and described in NO-C-178853 and the corresponding PCT Publication WO 95/14627. However, this prior art device does not have for its purpose to adjust the position of the belt in order to maintain it in a centred position relative to the centre line of the conveyor frame but rather to guarantee that the support rollers are constantly orientated at right angles to the conveyor belt, irrespective of whether the latter is centred or not. This purpose is achieved by arranging for the belt side-edges to travel along edge guide-rollers arranged at one end of a double-arm lever, the opposite end of which supports a stand in which the support roller is mounted. This mounting stand, which in its simplest form consists of a plate, is in turn pivotally connected to the double-arm lever. When the latter pivots in response to the engagement of the guide rollers with the belt edges, the support roller will automatically set itself in a position at right angles to the belt-travelling direction. In this prior-art device, return of the belt to the intended centre line of the path of travel of the belt might be achieved as a result of the edge guide rollers attempting to push the belt back to a centred position.

SUMMARY OF THE INVENTION

The object of the present invention is to provide belt steering means that automatically return a conveyor belt to the intended centre position along a path of travel. Thus, the steering means should be effective to ensure that the conveyor belt, as far as possible, travels in a centred position across support rollers, drive rollers and end rollers in a belt conveyor.

The invention is based on the idea, known per se, of angularly orientating a support roller in order to compensate for tendencies of the belt to run out of line. In the device in accordance with the invention the angular orientation of the support roller does, however, take place automatically and the degree of obliqueness is determined by the extent of the lateral movement of the conveyor belt relative to the intended path of travel along the belt conveyor.

In summary, the invention is based on the idea of utilising belt-position sensing means and belt re-adjustment means to steer the conveyor belt and to centre the latter relative to the intended path of travel of the belt. In accordance with the invention, the belt readjustment means is a belt-support roller which is intended to engage the belt and to roll against the latter and which is pivotal in the principal plane of the belt. The belt-position sensing means is connected to the belt-support roller via a linkage system for pivoting and adjusting the belt-support roller to a pivotal position in which the belt-support roller, owing to its engagement with the belt, exerts a readjustment force on the belt.

BRIEF DESCRIPTION OF THE DRAWINGS

The invention will be described in closer detail in the following with reference to the accompanying drawings illustrating some embodiments of belt steering means in accordance with the present invention and wherein:

FIG. 1 is a schematic view of a belt conveyor equipped with belt a steering means in accordance with the present invention.

FIG. 2 is a perspective view of the presently preferred embodiment of a belt steering means in accordance with the present invention.

FIG. 5 is a view of an alternative arrangement of a sensing roller incorporated in the device.

FIG. 6 is a view corresponding to FIG. 3 and shows a third embodiment of a belt steering means in accordance with the present invention.

FIG. 7 is a view of the same belt steering means as in FIG. 6 but showing it in a position wherein the belt has been displaced to one side relative to its intended centre position and in which the support roller of the belt steering means has been automatically set at an angle in order to return the belt to the intended centred position.

FIG. 8 is a view of a further embodiment of the belt steering means in accordance with the invention.

FIG. 9 is a sectional view on line IX—IX of FIG. 8 and

FIG. 10 is a view of yet another embodiment of the belt steering means in accordance with the invention.

DETAIL DESCRIPTION OF THE INVENTION

Figure 3:
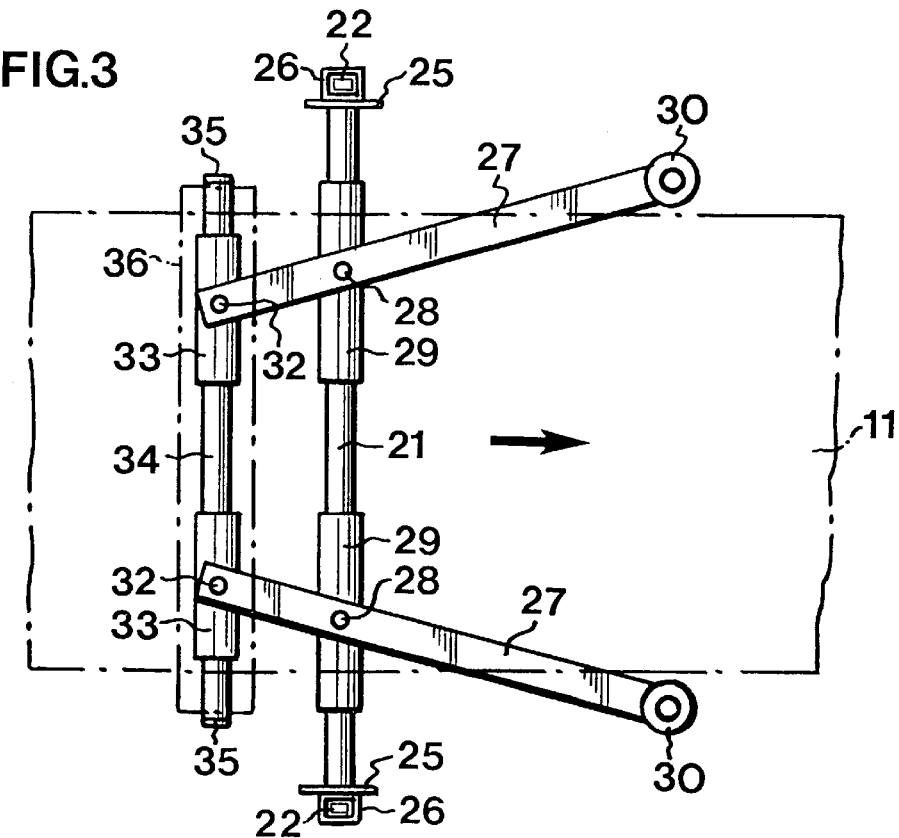
FIG. 3 is a view of a similar belt steering means in the position wherein the conveyor belt runs in a centred condition along the intended path of travel through the belt conveyor.

FIG. 1 is a schematic view of a belt conveyor 10. Said conveyor comprises an endless conveyor belt 11 running round end and drive rollers 12. The belt conveyor comprises a loading station 13 and a discharge station 14. Support rollers 17 are provided to support the upper-run part of the conveyor belt between the end rollers 12. Also over its return-run part 16 the belt is supported by support rollers 18 which could, however, be spaced further apart than the support rollers 17. In accordance with the invention the belt conveyor is equipped with an automatically operating belt steering device 20 which is positioned along the return part 16 close to the loading end of the belt conveyor. Within the scope of the invention, a belt conveyor could be equipped with a number of such belt steering devices 20.

The belt steering device 20 is shown in greater detail in FIGS. 2–5. This device comprises a frame including a crossbar 21 across which extends the intended path of travel of the belt and which is supported by uprights 22. The uprights may be attached to the belt conveyor frame or form a part thereof. In a corresponding way, the crossbar 21 may be part of the belt conveyor frame. However, it is preferred to arrange for the belt steering device to form a separate unit which is installed in the intended place in an existing belt conveyor.

The crossbar 21 is mounted in a holder 23 which is displaceable along the uprights 22 and may be set at the desired level along the latter, for instance with the aid of clamp bolts 24, In addition, the crossbar may advantageously extend through a sleeve included in the holder 23 and be secured to said sleeve with the aid of a corresponding clamp bolt 24. In this manner, the length of the crossbar is easily adjustable to the relevant width of the belt conveyor.

Each upright 22 supports a guide plate 25 mounted on a holder sleeve 26. The holder sleeve 26 is arranged to be set at the desired level with the aid of for instance a clamp bolt 24. The position of the guide plate 25 is adjusted to ensure that the plate is level with the edge of the conveyor belt.

The belt steering device 20 likewise comprises two steering arms 27, in accordance with the embodiment illustrated consisting of two-arm levers and being mounted for pivotal movement about a pivot pin or pivot 28 An a support sleeve 29. The support sleeve is fixed to the crossbar 21, for instance with the aid of a clamp bolt 24. A sensing means 30 is attached to one end of each one of the steering arms 27. The sensing means preferably is configured as a rotary roll attached to a crank arm 31 in order to allow adjustment of the position of the sensing means relative to the edge of the conveyor belt 11 and thus adaptation of the device to various belt widths. Owing to this arrangement, the crank arm 31 may be pivoted inwards and outwards relative to the arm 27 and consequently relative to the free edge of the belt 11.

At their opposite ends the two steering arms 27 are mounted for pivotal movement about their respective fulcrum pin or pivot 32 provided on an associated holder sleeve 33. A holder rod 34 extends through the two holder sleeves. At the ends of the rod, holders 35 are provided to support a support roller 36.

In accordance with the shown embodiment, the distance between the pivots 28 differs from (is larger than) the distance between the pivots 32. Accordingly, displacement of the belt 11 to the left with respect to the direction of travel of the belt (arrow R) from the position in FIG. 3 to the position of FIG. 4 forces the juxtaposed sensing roller 30 to move outwards, causing the holder rod 34 and consequently the support roller 36 to assume an oblique position in the opposite direction. In consequence thereof, the support roller 36, when rolling against the belt, will tend to return the belt to its starting position illustrated in FIG. 3 (i.e. to the right with respect to the direction of travel of the belt). When the belt, while being affected by the obliquely orientated support roller 36, creeps back towards the original position (FIG. 3), the sensing means 30 will detect the successive change of position of the belt and accordingly successively return the support roller 36 to its original position, viz. one in which it extends at right angles to the intended direction of travel of the belt. Should the belt instead creep to the right relative to the intended direction of travel of the belt, the support roller is caused to assume an oblique position in the opposite direction in order to compensate for and correct also this displacement of the belt.

The degree of obliquity of the support roller 36 relative to the intended path of travel of the belt at the occurrence of a predetermined lateral displacement of the belt may be regulated by changing the ratio of on the one hand the distance between the pivots 28 and on the other between the pivots 32. If the distance between the pivots 32 is reduced or the distance between the pivots 28 is increased the leverage will increase and thus also the angle of obliquity. The magnitude of the leverage required in each individual case may be easily determined by the expert experimentally. Should the distance between the pivots 32 be shorter than the distance between pivots 28, as is the case in the embodiments of FIGS. 2–4, the distance between the sensing rollers 30 will increase when the support roller adopts an oblique position. This is advantageous, since it prevents the occurrence of clamping effects. Should the distance between the pivots 28 be smaller than the distance between the pivots 32, the distance between the sensing rollers 30 will be reduced, with the result that if the worst comes to worst these rollers will be pressed against the belt edges from opposite directions. Consequently, the distance between the pivots 32 preferably should be less than the distance between the pivots 28.

Figure 4:
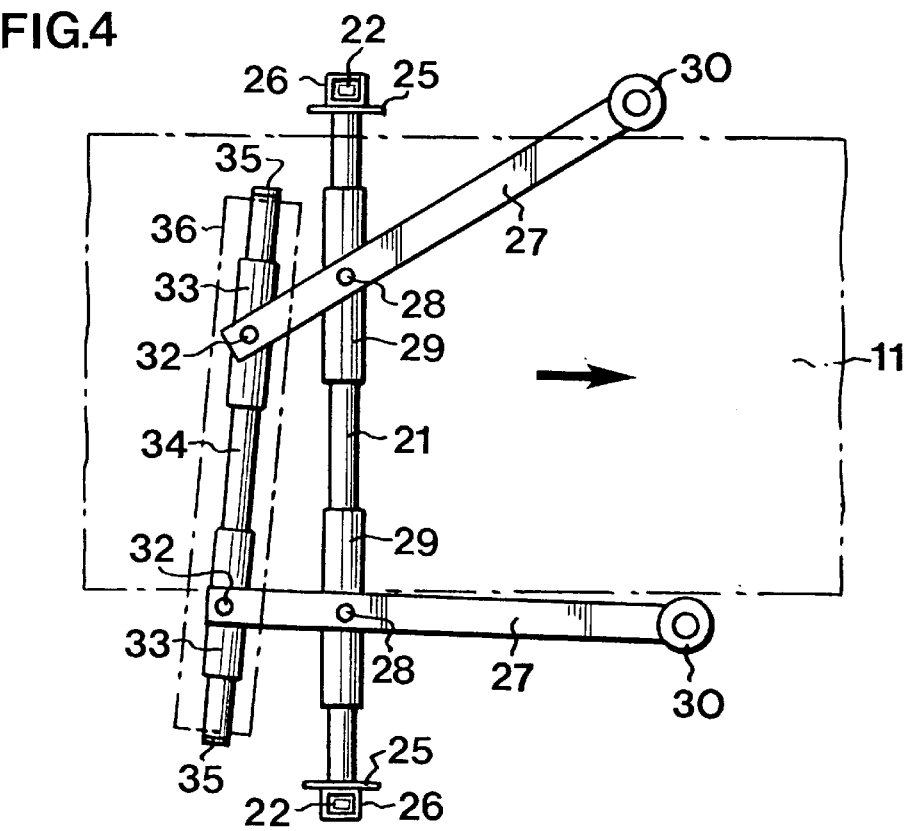
FIG. 4 is a view of the same belt steering means as in FIG. 3 but showing the latter in a position, wherein the belt has been displaced to one side relative to the intended centre position and wherein the support roller of the belt steering means is automatically set at an angle in order to return the belt to the intended centred position.

Alternatively designed belt steering means are conceivable while making use of the same inventive idea. In the embodiment of FIG. 2 the sensing rollers 30 are arranged on a crank arm 31 which in turn is pivotally mounted on the steering arm 27. In the embodiment of FIGS. 3 and 4 the sensing rollers 30 are rotatably mounted directly on the steering arms 27.

In both embodiments according to FIGS. 2–4 the sensing rollers 30 are perpendicular to the plane of the belt. In some cases it may, however, be advantageous to be able to arrange the axes of the sensing rollers at an angle, whereby they will assume an outwards or inwards inclined orientation relative to the edges of the belt. One possibility of achieving this is suggested by the embodiment according to FIG. 5, wherein the crank arm 37 is provided with a bearing bushing 38 and a pivot 30. Owing to this arrangement, the pivot pin 39 may be pivoted relative to the arm 27 while simultaneously rotating relative to the bearing bushing 38.

Another possible modified embodiment, however less preferred than the embodiments in FIGS. 2–5, includes the use of one-arm levers instead of double-arm levers to serve as steering arms. An embodiment of this kind is illustrated in FIGS. 6 and 7. In this case, the holding rod 34' of the support roller is pivotally connected to the levers 27' at a point intermediate the ends of the levers. One end of the levers or steering arms is connected to the frame or to the crossbar 21 via a pivot pin or pivot 28'. The sensing rollers 30 are rotatably connected to the levers or steering arms at the opposite ends thereof. The holding rod 34' of the support roller 36 is pivotally connected to the steering arm 27' via fulcrum pins or pivots 28' at a point intermediate the steering arm ends.

Like in the embodiment described above the distance between the pivot pins differs from the distance between the fulcrum pins, with the result that the support roller will be obliquely orientated relative to the intended direction of travel of the belt, should the belt be displaced laterally relative to the frame or crossbar 21'. In this case, the travelling direction of the belt is reversed, and consequently the belt will come into contact with the sensing rollers 30' before reaching the support roller 36'. The reason therefor is that the oblique orientation of the support roller, upon lateral displacement of the belt, will be the opposite one in comparison with the case when a double-arm lever is used as the steering arm.

Also other modifications of the embodiments as shown and described are possible. For instance, resetting of the distances between the pivots 28, 28' and between the pivots 32, 32', respectively, could be achieved by using an adjustment means in the form of a screw device one end of which is formed with left-hand threads and the opposite end with right-hand threads for engagement with pin-shaped cam means arranged on the carrying and holding sleeves 29 and 33, respectively. Another possible modification is to change the leverage of the respective levers 27, 27', i.e. the ratio between on the one hand the distance between the pivots 28, 28' and 32, 32' and on the other the distance between the pivots 28, 28' and the sensing rollers 30.

FIGS. 8–10 show two other examples of a belt steering device which is designed in accordance with the invention and which uses double-arm levers to serve as the steering arms. In contrast to the embodiment according to FIGS. 2–4 the levers are configured with two arm sections 27a, 27b which may be set in different angular positions relative to one another. This feature is achieved by providing the two arm sections 27a, 27b with interengaging bearing bushings mounted on top of the pivot 28 on the carrier sleeve 29 and lockable in the set angular position relative to one another with the aid of a clamping bolt 24.

The embodiment according to FIGS. 8–10 may advantageously be used in belt conveyor installations wherein the belt-travelling direction is reversible. FIG. 8 shows the set position used if the belt reaches the sensing means 30 before passing across the support roller 36. In this case the arm sections 27a, 27b are at an angle relative to one another and are locked in a position wherein the distance between the pivot pins 28 is shorter than the distance between the fulcrum pins 32. As a result, the support roller 36 is angled in the correct direction in order to be able to return the belt to the neutral position illustrated in FIG. 8, should a lateral belt displacement occur.

Should the belt travel direction be reversed in the belt conveyor, the arm sections 27a, 27b are set at an angle in the opposite direction and locked, as illustrated in FIG. 10. Since in this case the belt will reach the support roller 36 before coming into contact with the sensors 30, the distance between the pivot pins 28 is longer than the distance between the fulcrum pins 32, with the result that the support roller will be inclined in the right direction to return the belt to the neutral position of FIG. 10, should a lateral belt displacement occur.

What is claimed is:

1. A device for adjusting the lateral position of a belt relative to an intended belt-traveling path, comprising belt-position sensing members and a belt readjustment assembly wherein the belt readjustment assembly comprises a belt support roller supported in rolling contact with the belt by an interconnection link and arranged for pivotal and lateral movement adjacent the belt, and the belt-position sensing members are connected to the interconnection link and, thus, the belt-support roller, by a linkage system for pivoting and setting the belt-support roller in a pivoted and laterally shifted position in which said belt-support roller, by engaging the belt, exerts a readjustment force thereon, wherein the linkage system comprises two levers each carrying a respective belt-position sensing member adjacent a respective side of the belt, each lever being, at a first point along its length, pivotally connected to the interconnection link and also being, at a second point along its length, pivotally connected to a support, the distance between the two first pivot points of the two levers being different from the distance between the two second pivot points of the two levers.

2. A device as claimed in claim 1, wherein the distance between the two second pivot points is smaller than the distance between the two first pivot points when the intended direction of movement of the belt is such that the belt comes into contact with the belt-position sensing members before coming into contact with the belt-support roller.

3. A device as claimed in claim 1, wherein the distance between the two second pivot points is greater than the distance between the two first pivot points when the intended direction of movement of the belt is such that the belt comes into contact with the belt-support roller before coming into contact with the belt-position sensing members.

4. A device as claimed in claim 3 further comprising reset means for changing the distance between the second pivot points and the distance between the first pivot points, respectively.

5. A device as claimed in claim 1, wherein the linkage system comprises two double-arm levers having opposed ends, one of the ends of said levers supporting the belt-position sensing members and the opposite ends of said levers being pivotally connected to the interconnection link, and wherein the two second pivot points are located at a point intermediate the lever ends.

6. A device as claimed in claim 5 wherein the double-arm levers have two arm sections, said arm sections being pivotal relative to one another and lockable in different relative angular positions.

7. A device as claimed in claim 5 wherein the double-arm levers have two arm sections, said arm sections being pivotal relative to one another and lockable in different relative angular positions.

8. A device as claimed in claim 7 further comprising reset means for changing the distance between the second pivot points and the distance between the first pivot points, respectively.

9. A device as claimed in claim 1, wherein the linkage system comprises two single-arm levers having opposed ends, one of the ends of said levers supporting the belt-position sensing members and the opposite ends of said levers being pivotally connected to the support, and wherein the two first pivot points are located at a point intermediate the lever ends.

10. A device as claimed in claim 9, wherein the distance between the two second pivot points is smaller than the distance between the two first pivot points.

11. A device as claimed in claim 10 further comprising reset means for selectively changing the distance between the two second pivot points and the distance between the two first pivot points, respectively.

12. A device for adjusting the lateral position of a belt relative to an intended belt-traveling path, comprising belt-position sensing members and a belt readjustment assembly wherein the belt readjustment assembly comprises a belt support roller arranged for pivotal and lateral movement adjacent the belt, and the belt-position sensing members are connected to the belt-support roller by a linkage system for pivoting and laterally moving and setting the belt-support roller in a pivoted and laterally shifted position in which said belt-support roller, by engaging the belt, exerts a readjustment force thereon, wherein the linkage system comprises two levers each carrying a respective belt-position sensing member adjacent a respective side of the belt and forming the sensing means, each lever being, at a first point along its length, pivotally connected to an interconnection link arranged to support the belt-support roller in rolling contact with the belt, and also being, at a second point along its length, pivotally connected to a support, the distance between the two first pivot points of the two levers being different from the distance between the two second pivot points of the two levers, and wherein said device further comprises reset means for selectively changing the distance between the first pivot points and the distance between the second pivot points, respectively.

13. A device for adjusting the lateral position of a belt relative to an intended belt-traveling path, comprising belt-position sensing members and a belt readjustment assembly wherein the belt readjustment assembly comprises a belt support roller arranged for pivotal and lateral movement adjacent the belt, and the belt-position sensing members are connected to the belt-support roller by a linkage system for pivoting and laterally moving and setting the belt-support roller in a pivoted and laterally shifted position in which said belt-support roller, by engaging the belt, exerts a readjustment force thereon, wherein the linkage system comprises two levers each carrying a respective belt-position sensing member adjacent a respective side of the belt and forming the sensing means, each lever being, at a first point along its length, pivotally connected to an interconnection link arranged to support the belt-support roller in rolling contact with the belt, and also being, at a second point along its length, pivotally connected to a support, the distance between the two first pivot points of the two levers being different from the distance between the two second pivot points of the two levers, wherein said device further comprises reset means for selectively changing the distance between the first pivot points and the distance between the second pivot points, respectively, and wherein the distance between the two second pivot points is smaller than the distance between the two first pivot points when the intended direction of movement of the belt is such that the belt comes into contact with the belt-position sensing members before coming into contact with the belt-support roller.

14. A device for adjusting the lateral position of a belt relative to an intended belt-travel direction which comprises:
   belt-position sensing members;
   belt readjustment assembly including:
      a belt-support roller for engaging the belt and exerting a readjustment force thereon,
      an interconnection link having opposed ends and being disposed adjacent the belt-support roller and operably connected thereto,
      a crossbar disposed generally transverse to the intended belt-travel direction, at least two levers, said levers each being operably connected to one of the belt-sensing members, said levers each further having a first pivotal connection to the crossbar support and a second pivotal connection to one of the ends of the interconnection link,
   wherein the interconnection link and its associated roller are pivotally supported by the levers so as to allow the belt-support roller to achieve both pivotal and lateral movement when engaging the belt to exert a readjustment force thereon.

15. A device as claimed in claim 14, wherein the two levers are single arm levers.

16. A device as claimed in claim 14, wherein the two levers are double arm levers.

17. A device as claimed in claim 14, wherein the distance between the first pivotal connections on the crossbar is shorter than the distance between the second pivotal connections on the interconnection link.

18. A device as claimed in claim 14, wherein the distance between the two first pivotal connections on the crossbar is longer than the distance between the second pivotal connections on the interconnection link.

19. A device as claimed in claim 14, wherein the first pivotal connections are at one of the ends of the levers and the second pivotal connections are intermediate the ends of the levers.

20. A device as claimed in claim 14, wherein the second pivotal connections are at one of the ends of the levers and the first pivotal connections are intermediate the ends of the levers.

21. A device as claimed in claim 14, further comprising reset means for selectively changing the distance between the second pivotal connections and the distance between the first pivotal connections, respectively.

* * * * *

UNITED STATES PATENT AND TRADEMARK OFFICE
CERTIFICATE OF CORRECTION

PATENT NO. : 6,116,410
DATED : September 12, 2000
INVENTOR(S) : Mats Anders Malmberg Page 1 of 1

It is certified that error appears in the above-identified patent and that said Letters Patent is hereby corrected as shown below:

Cancel Claim 6 without prejudice or disclaimer.

Signed and Sealed this

Eighteenth Day of September, 2001

Attest:

*Attesting Officer*

NICHOLAS P. GODICI
*Acting Director of the United States Patent and Trademark Office*